United States Patent [19]

Gower

[11] 4,361,178
[45] Nov. 30, 1982

[54] STRAIGHT LINK STUDDED TIRE CHAIN

[76] Inventor: Roger L. Gower, 21 Coburn Ave., Skowhegan, Me. 04976

[21] Appl. No.: 229,030

[22] Filed: Jan. 27, 1981

[51] Int. Cl.³ ............................................. B60C 27/00
[52] U.S. Cl. .................................... 152/172; 152/187; 152/239; 152/245
[58] Field of Search ............... 152/239, 243, 244, 245, 152/167, 170, 171, 172, 179, 182, 183, 184, 187, 190, 191, 185.1, 231, 232, 217–219; 59/84, 90, 93

[56] References Cited

U.S. PATENT DOCUMENTS

| | | | |
|---|---|---|---|
| Re. 28,898 | 7/1976 | Gower | 152/243 X |
| 1,364,454 | 1/1921 | Ross | 152/239 |
| 1,972,297 | 9/1934 | Hall | 152/243 X |
| 2,223,942 | 12/1940 | McKinnon | 152/243 X |

*Primary Examiner*—Edward C. Kimlin
*Assistant Examiner*—Thomas Bokan
*Attorney, Agent, or Firm*—Pollock, Vande Sande & Priddy

[57] ABSTRACT

An improved tire protection chain (14) is disclosed which comprises a plurality of flat metal rings (16) disposed in a staggered pattern over the tread surface of the tire. Means (18) are provided for joining the rings into a flexible mesh, this means comprising at least one flat, oblong chain link (20, 22) oriented so that one of its long sides (30) faces toward the tire surface and the other of its long sides (28) faces away from the tire surface. Attached to the side of the chain link which faces away from the tire surface is at least one traction stud (36, 38, 40). The central opening of the oblong chain link is configured so that rotation of the oblong chain link is limited relative to adjacent links or rings.

8 Claims, 6 Drawing Figures

STRAIGHT LINK STUDDED TIRE CHAIN

DESCRIPTION

1. Technical Field

The present invention relates to protective chains for use on vehicle wheels. Particularly, the invention concerns a type of protective chain in which at least some of the chain links comprise outwardly extending stubs which engage the ground surface.

2. Background Art

Tire protective chains having studded links have been known for a number of years; however, some disadvantages of such chains have been noted. For example, portions of such chains have been known to rotate in such a way that the studs or lugs face toward the tire tread rather than toward the road surface, with the result that the studs actually cause, rather than prevent, excessive tire wear. In other cases, the protective chain has been so configured that at least some portions of the chain tend to slip into the valleys between the tire treads or lugs, thereby reducing the effectiveness of the chain. U.S. Pat. No. Re. 28,898, issued to the present applicant on July 13, 1976, discloses a type of protective tire chain which avoids these disadvantages; however, the tire chain disclosed in this patent comprises studded chain links which are twisted from a flat form into a distorted form in order to orient the studs outwardly. While these twisted links perform rather well, they are somewhat difficult to manufacture and rather susceptible to clogging during use.

DISCLOSURE OF THE INVENTION

An object of the present invention is to provide a tire protective chain which is made from straight or flat chain links, thereby eliminating the need for twisted links used in the prior art.

Another object of the invention is to provide such a tire protective chain in which the straight links include outwardly extending studs which reduce chain wear and provide improved traction.

Yet another object of the invention is to provide a tire protective chain which is sufficiently flexible to ensure a good fit to the underlying tire.

Yet another object of the present invention is to provide such a tire protective chain which is essentially self-cleaning, so that undesirable accumulations of dirt, rocks, ice and snow are avoided.

These objects of the invention are given only by way of example; thus, other desirable objectives and advantages inherently achieved by the disclosed tire protective chain may occur or become apparent to those skilled in the art. Nonetheless, the scope of the invention is to be limited only by the appended claims.

In accordance with one embodiment of the invention, the tire protective chain comprises an assembly of link elements which is especially adapted for mounting on a tire of a vehicle. The assembly includes a pattern of flat rings spaced at intervals over the tread surface of the tire. A plurality of means are provided which comprise at least one chain link, at least one of these means being connected to each ring and at least some of these means interconnecting a pair of the rings. The at least one chain link comprises a rigid, essentially flat oblong annular body with a pair of essentially straight side elements joined at their opposite ends by a pair of semi-circular end elements, to define an oblong central opening. The at least one chain link is oriented so that one of its side elements faces from the central opening toward the tread surface of the tire and the other of the side elements faces from the central opening away from the tread surface of the tire. Finally, at least one stud or lug is affixed to the other of the side elements, the stud being oriented to face away from the tread surface of the tire. A single stud may be used, positioned either centrally or at any desired location along the side element; or, alternatively, two stud elements may be used, preferably one at each end of the side elements of the chain link.

In one embodiment, the means for interconnecting the rings comprises a pair of the previously mentioned studded chain links joined by a connecting, non-studded link through the central openings of the studded chain links. A ring also passes through the central opening of each of the pair of studded chain links. In this embodiment, the connecting, non-studded link between the two studded chain links may be an essentially flat, circular ring or an essentially flat, oblong ring, as desired. Of course, the connecting link may be studded without departing from the scope of the present invention. Preferably, the central scope of the present invention. Preferably, the central openings and bodies of the various chain links are proportioned to prevent greater than approximately 15° rotation of the studded chain links relative to an adjacent ring or link, so that the studs are retained in their desired outward orientation.

The pattern of flat rings preferably is disposed in a staggered relation over the tread surface of the tire and the means interconnecting the rings are oriented so that they have a component essentially parallel to the tire's circumference and also a component cross-wise of the tire tread, thereby forming a flexible polygonal pattern across the tire which facilitates tightening the chain to the tire. Preferably, the means for interconnecting the rings comprises an odd number of links so that the at least one chain link is maintained with its studs oriented outwardly.

BEST MODE FOR CARRYING OUT THE INVENTION

Figure 1:
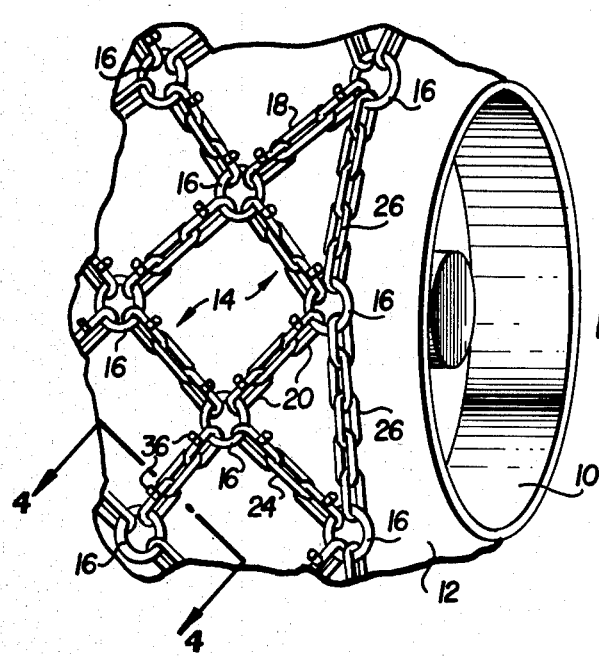
FIG. 1 shows a fragmentary perspective view of a vehicle wheel and tire assembly on which a tire protective chain according to the invention has been mounted.

The following is a detailed description of a tire protective chain according to the invention, reference being made to the drawings in which like reference numerals identify like elements of structure in each of the several Figures.

Figure 2A:
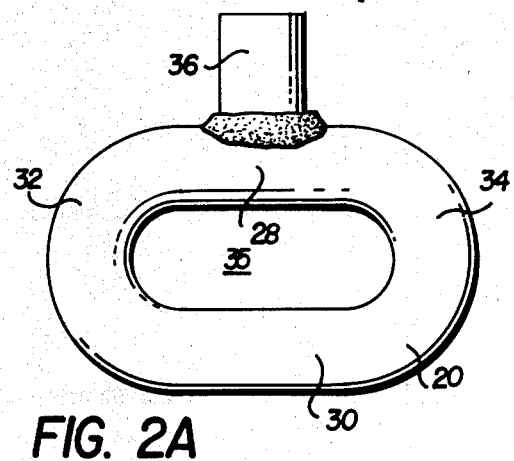
FIGS. 2A and 2B show alternative forms of a flat studded chain link of the type used in the invention.
Figure 2B:
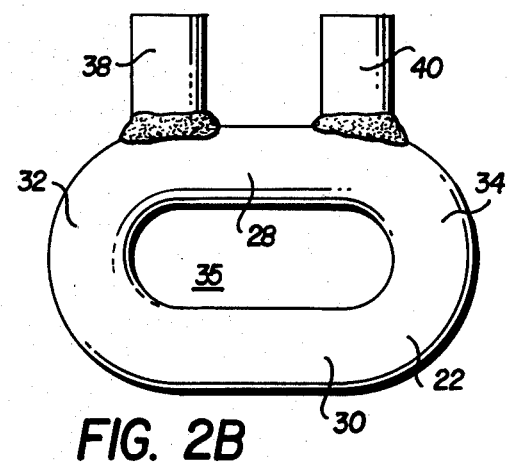
Figure 3:
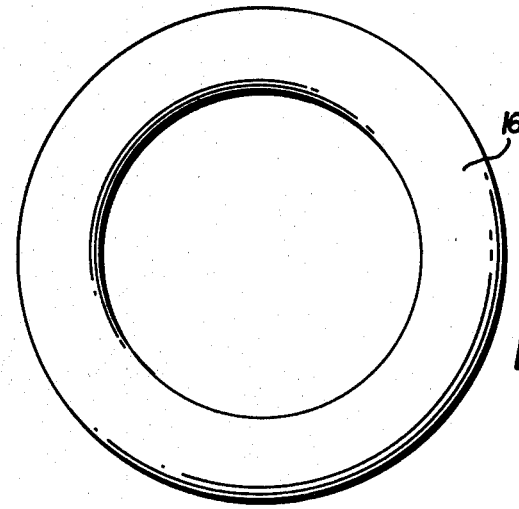
FIG. 3 shows a plan view of a connecting ring used in a protective chain according to the invention.

In FIG. 1, a wheel 10 supports a heavy duty pneumatic tire 12 of the type commonly used on large earthmoving and construction equipment. A tire protective chain 14 according to the present invention is mounted on the exterior tread surface of the tire and is seen to comprise a plurality of essentially flat metal connecting rings 16, preferably having a circular cross-section. See FIG. 3. The rings are arranged in a pattern of staggered rows around the circumference of the tire. Extending between rings 16 are means 18 for interconnecting the rings, which preferably comprise an odd number of links and include at least one straight, essentially flat single-studded link 20 or a straight, essentially flat double-studded link 22, as shown in FIGS. 2A and 2B, respectively. In the embodiment illustrated in FIG. 1, means 18 comprises two studded links joined by a straight, flat connecting link 24 which may be identical to links 20, 22 but without their studs, or may be round, as desired. Preferably, at least two interconnecting means 18 extend from each ring 16; however, three or four interconnecting means also may be used. See FIG. 5. On each side of the protective chain 14, a side chain 26 is provided which preferably is made from flat, straight linked chain but also may be made from twisted link chain, as desired.

As shown in FIG. 1, the staggered pattern of rings 16, interconnected by means 18 and side chains 26, provides a flexible protective chain assembly in which most of the chain segments or means 18 interconnecting the rings lie at an angle or in a direction having a component essentially parallel to the tire's circumference and also having a component crosswise of the tire tread, thus forming a flexible, polygonal pattern of links and rings which facilitates tightening the chain.

As shown in FIGS. 2A and 2B, straight, flat single-studded link 20 and double-studded link 22 each comprise a flat annular body made from round alloy steel stock. The body is oblong and includes essentially parallel side elements 28, 30 which are joined at their opposite ends by essentially semi-circular end elements 32, 34. In FIG. 2A a single central stud 36 is illustrated which may be resistance welded to one of the side elements of the link. In FIG. 2B, end studs 38, 40 are provided at the end of the side elements just above the ends of central opening 35 where the adjacent connecting link or ring would be located in use, so that the studs protect the points of maximum wear. Such studs also may be located at any desired location along the side elements of the annular body; however, it is preferred to place them at the ends of the side elements where the chain link joins an adjacent ring or link.

Figure 4:
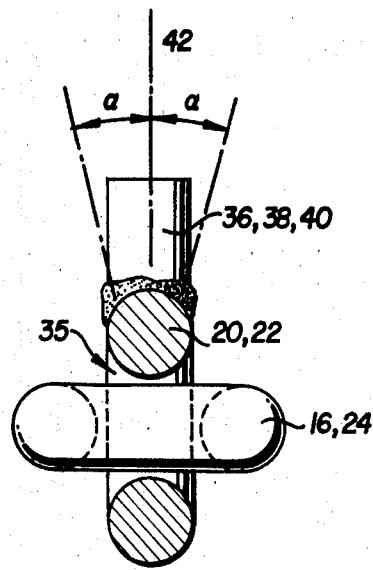
FIG. 4 shows a view, partially in section, of a flat studded chain link connected to an adjacent connecting ring or link, indicating the geometry of the links which limits relative rotation therebetween.

FIG. 4 shows a view taken along line 4—4 in FIG. 1. A plane 42 is illustrated passing through the axis of symmetry of link 20, 22 and stud 36, 38, 40. The cross-sectional diameter of link 20, 22 and connecting link or ring 16, 24 is chosen so that the two may rotate relative to each other through an angle ($\alpha$) on either side of plane 42. This angle preferably is approximately 7.5° in magnitude so that links 20, 22 cannot rotate very far relative to links 16, 24 but, rather, are maintained with studs 36, 38, 40 facing outwardly away from the tire.

Figure 5:
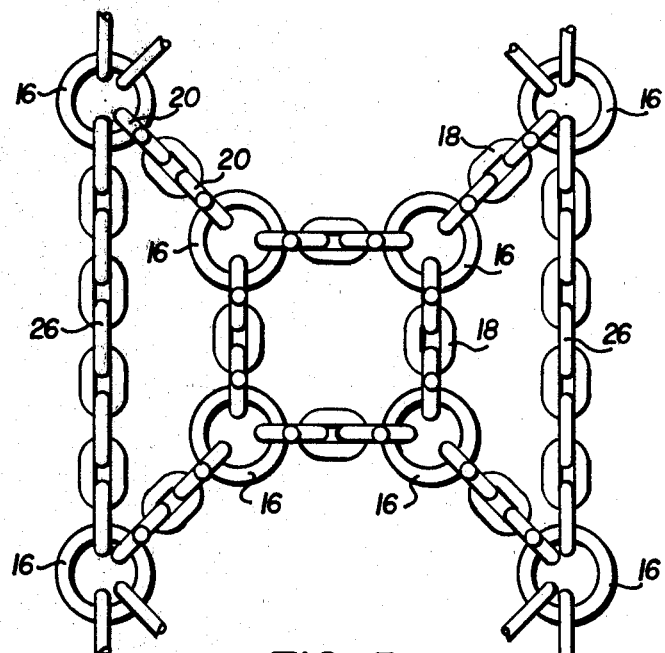
FIG. 5 shows a fragmentary plan view of a tire protective chain according to the invention in which an alternative arrangement of connecting rings and studded links is used.

FIG. 5 shows a fragmentary view of a tire protective chain in which links 16 and their associated interconnecting means 18 are arranged in a somewhat different pattern. Here, a square central chain opening is defined by four rings 16 and four connecting means 18. The corner rings 16 also are connected to further connecting means 18 which extend at an angle toward the side of the tire protective chain at which point they join additional rings 16 connected to side chains 26 to define the chain geometry shown in FIG. 5. In this case, only three connecting means 18 are attached to the rings 16 at the center portion of the tire protective chain, thereby reducing the overall cost of the chain assembly.

Having described my invention in sufficient detail to enable those skilled in the art to make and use it, I claim:

1. An assembly of link elements adapted for mounting on a tire of a vehicle, said assembly comprising:

a succession of rings spaced at intervals over the tread surface of the tire;

a plurality of means comprising at least one chain link, at least two of said means being connected to each ring, at least some of said means interconnecting a pair of said rings;

said at least one chain link having a rigid, essentially flat annular body with a pair of side elements joined at opposite ends by a pair of end elements to define an oblong central opening, said central opening and said annular body being proportioned to prevent greater than 15° rotation of said at least one chain link relative to an adjacent link or ring, said at least one link being oriented, when the assembly is mounted on a tire, such that one of said side elements faces from said opening toward the tread surface of the tire and the other of said side elements faces from said opening away from the tread surface of the tire; and at least one stud affixed to the other of said side elements such that said stud faces away from the tread surface of the tire.

2. An assembly according to claim 1, wherein said at least one stud is positioned centrally of said other side element.

3. An assembly according to claim 1, wherein there are two studs, one at each end of said other side element.

4. An assembly according to claim 1, wherein said means comprises a pair of said chain links joined by a connecting link through the central openings thereof, one of said rings also passing through the central opening of each of said pair of chain links.

5. An assembly according to claim 1, wherein said connecting link is an essentially flat circular ring.

6. An assembly according to claim 1, wherein said connecting link is an essentially flat oblong ring.

7. An assembly according to claim 1, wherein said rings are disposed in a staggered relation over said tread and said means interconnecting said rings lie in a direction having a component parallel to the tire's circumference and also a component crosswise of the tire tread, thereby forming a polygonal pattern across the tire.

8. An assembly according to claim 1, wherein each of said means comprises an odd number of links, including said at least one link.

* * * * *